United States Patent [19]

Rendall et al.

[11] Patent Number: 5,074,358
[45] Date of Patent: Dec. 24, 1991

[54] SURFACTANT-STABILIZED FOAMS FOR ENHANCED OIL RECOVERY

[75] Inventors: William A. Rendall; Conrad Ayasse; Jaromir Novosad, all of Calgary, Canada

[73] Assignee: Alberta Oil Sands Technology and Research Authority, Edmonton, Canada

[21] Appl. No.: 547,278

[22] Filed: Jul. 3, 1990

[51] Int. Cl.$^5$ .................................................. E21B 43/22
[52] U.S. Cl. ..................................... 166/273; 166/268; 166/274; 166/309; 252/8.554
[58] Field of Search ............... 166/268, 272, 273, 274, 166/275, 294, 309; 252/8.554

[56] References Cited

U.S. PATENT DOCUMENTS

| | | | |
|---|---|---|---|
| 4,130,491 | 12/1978 | Wagner et al. | 252/8.554 |
| 4,572,294 | 2/1986 | Duerksen et al. | 166/273 |
| 4,703,797 | 11/1987 | Djabbarah | 252/8.554 X |
| 4,706,752 | 11/1987 | Holm | 166/273 |
| 4,763,730 | 8/1988 | Suzuki | 166/309 X |
| 4,823,873 | 4/1989 | Karydas | 166/272 |
| 4,836,281 | 6/1989 | Robin et al. | 166/272 |
| 4,860,828 | 8/1989 | Oswald et al. | 166/268 X |
| 4,923,009 | 5/1990 | Watkins | 166/272 |

FOREIGN PATENT DOCUMENTS 2031482 4/1980 United Kingdom .

Primary Examiner—George A. Suchfield
Attorney, Agent, or Firm—Ernest Peter Johnson

[57] ABSTRACT

A foam is provided for use in a subterranean oil-bearing formation for reducing and controlling the mobility of a gaseous drive fluid. The foam is generated using an inert gas and a fluorocarbon surfactant solution in admixture with an amphoteric or anionic hydrocarbon surfactant solution. A relatively small amount of the fluorocarbon surfactant is operative, when mixed with the hydrocarbon surfactant and foamed, to generate a foam that has better stability when in contact with oil than a foam made with hydrocarbon surfactant alone.

8 Claims, 2 Drawing Sheets

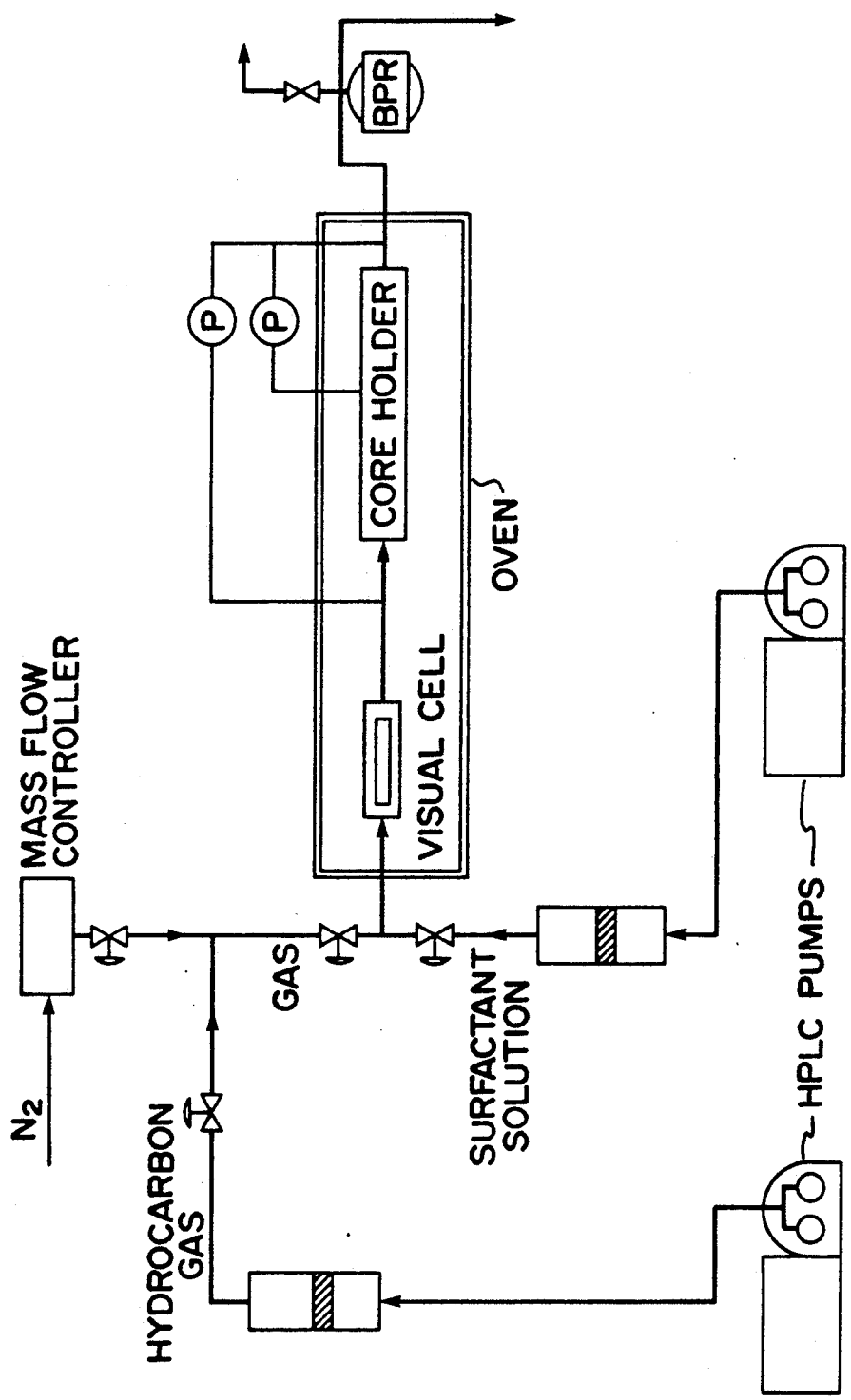

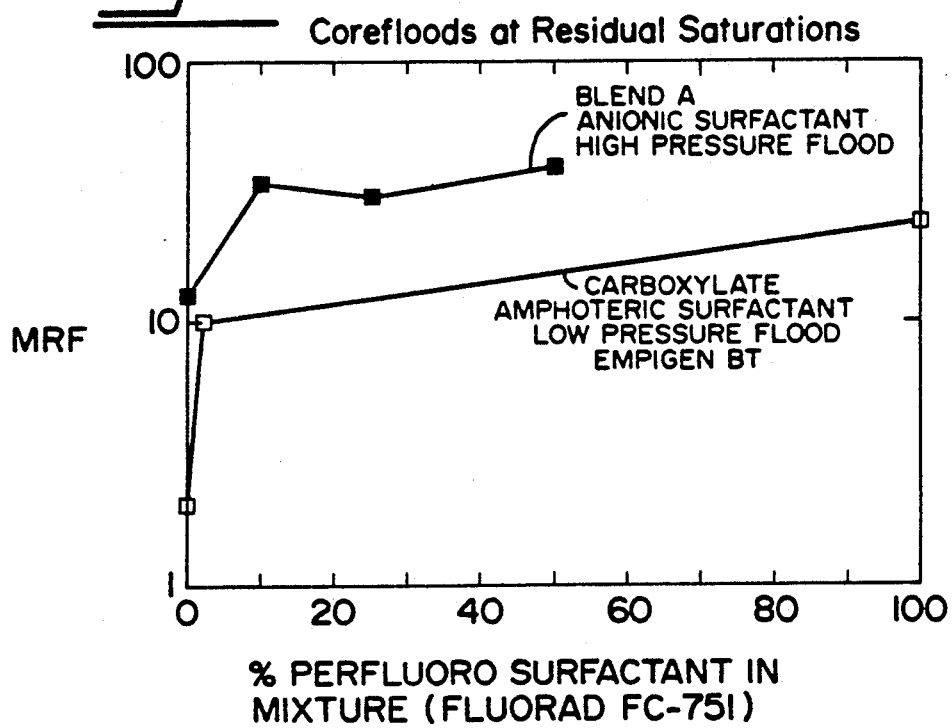
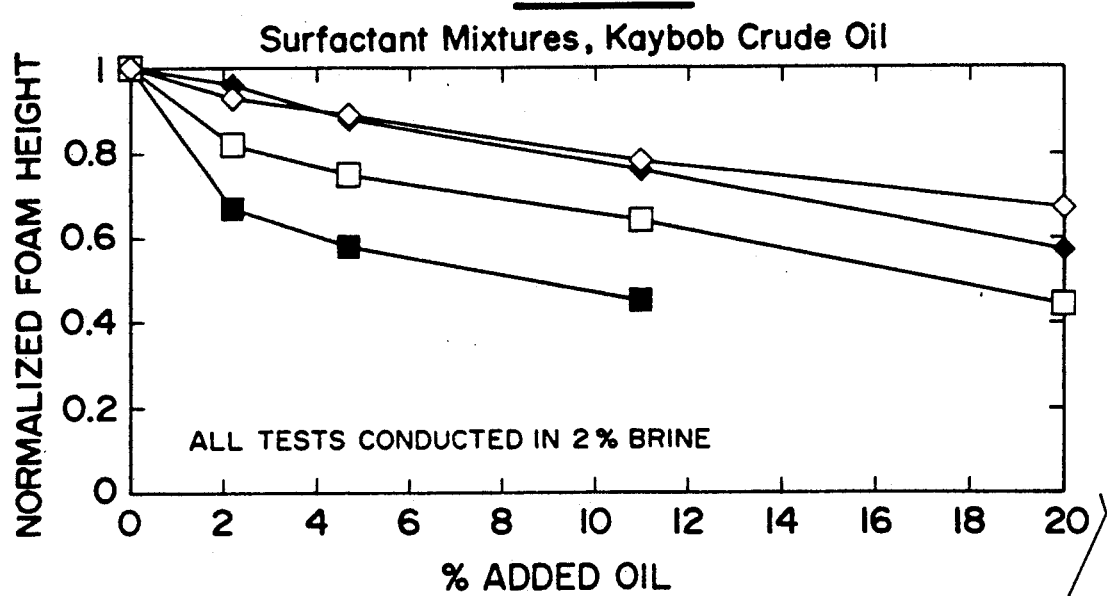

SURFACTANT-STABILIZED FOAMS FOR ENHANCED OIL RECOVERY

FIELD OF THE INVENTION

The present invention relates to a foam for use in a subterranean oil-bearing formation. The foam functions to control and reduce the mobility of a gaseous displacement fluid injected into the formation. The foam is generated using a combination of surfactants.

BACKGROUND OF THE INVENTION

In the recovery of oil from a subterranean oil-bearing formation only a limited amount of the oil in place is recoverable by use of primary and secondary recovery processes. Hence, several tertiary or enhanced oil recovery processes have been developed. Such processes include thermal processes, exemplary of which are steam flooding and in-situ combustion, chemical flooding techniques and gaseous displacement fluid recovery methods. The gases utilized include steam, carbon dioxide, nitrogen or hydrocarbons. The present invention has to do with improving gaseous displacement fluid recovery methods.

There are problems associated with the use of gaseous displacement fluid recovery methods. First, fingering of the gas phase into the oil, with attendant degradation of the uniform displacement front, may take place. This is because of the adverse mobility ratio between the displacing gas and the oil. The second problem is gravity override which is promoted by the density difference between the gas and oil phases. Thus because the sweep efficiency, or contact between the injected fluid and the oil in the reservoir, is reduced because of these problems, the incremental recovery will as a result also be reduced. Reservoir heterogeneity will further compound these problems by promoting channelling, thereby further reducing the sweep efficiency.

Foams have been emplaced in a reservoir as a means for combatting fingering or gravity override by the gaseous displacement fluid. Such foams are normally formed using a gas, a surfactant and a liquid. The foam is either generated in-situ by injecting the ingredients into the formation or is formed at surface and injected as a foam per se. The best process involves injecting the surfactant solution and, once it is in position within the reservoir, then injecting the gas to form the foam.

The use of foams for mobility control has been well documented and described in the patent literature. For example, such a process is described by Worton et. al. in U.S. Pat. No. 2,623,596, utilizing carbon dioxide as a miscible solvent gas. U.S. Pat. No. 3,342,256 by Bernard et. al., describes a process for improving sweep efficiency when injecting water and gas into a reservoir wherein a variety of surfactants have been added to the water. Successful field applications using foams have been reported. Castanier reported the results of 16 field tests of surfactants used in conjunction with steam, both with and without inert gases. (Proc. 4th European Symposium on EOR, Oct. 27-30, Hamburg, West Germany, 1987). Hirasaki reported the results of 10 field tests using steam foams, all of which were successful (Journal of Petroleum Technology, May, 1989, p. 449-456). Smith disclosed the results of 4 successful non-thermal foam floods (ACS Symposium Series 373, Chapter 22, 1987).

The foam exhibits a viscosity which is greater than either the gas or liquid phases of which it is composed. The foam functions by reducing the mobility of the subsequently injected gas in the portions of the reservoir where it is found. The foam accumulates preferentially in the well-swept and/or higher permeability zones of the formation that would otherwise expend a large quantity of the injected gas. Thus, the use of foams will cause the injected gas to be directed to other parts of the formation which had been either unswept or underswept previously.

Recent studies have indicated that the oil phase will influence the stability and performance of foams. It is accepted that crude oils will generally act as a defoaming agent. However, not every foam will be destabilized by the oil phase. Indeed, in some instances exactly the opposite may occur.

Typically, the performance of the foam in a porous medium is determined by its ability to increase the pressure drop across the porous medium.

It is known that fluorocarbon surfactants will function as interfacial tension reducing agents in an oil medium. Additionally, it is known that such surfactants will generate stabilized foams in an oil phase medium. This is exemplified in U.S. Pat. No. 4,836,281, issued to M. Robin and C. Demay. It is further known that amphoteric and anionic hydrocarbon surfactants are extremely oil-sensitive, demonstrating poor stability in the presence of an oil phase.

SUMMARY OF THE INVENTION

In accordance with the present invention, we have found, surprisingly, that the oil-sensitivity of amphoteric and anionic hydrocarbon surfactants can be rendered less severe by the addition thereto of a relatively small amount of a fluorocarbon surfactant. There exists a synergistic effect between these two types of surfactant when they are used in combination for foam generation—they produce a surfactant-stabilized foam which is much more tolerant to oil. Advantageously, only a small amount of the more costly fluorocarbon surfactant is required when combined with amphoteric or anionic hydrocarbon surfactants. Fluorocarbon surfactants are typically ten-fold the cost of the hydrocarbon surfactants; therefore the discovery that only very small quantities of fluorocarbon surfactants impart oil tolerance to the surfactant combination greatly improves the economics of foam flooding.

The composition of the surfactant-stabilized foam will now be elaborated upon: The amphoteric hydrocarbon surfactant preferably is selected from the group consisting of betaines, sulfobetaines and carboxylate betaines. Most preferably, the amphoteric hydrocarbon surfactant is Varion CADG-HS ™, Varion CAS ™ or Empigen BT ™.

The anionic hydrocarbon surfactant preferably is selected from the group consisting of sulfates and sulfonates. More preferably, the anionic hydrocarbon surfactant is an α-olefin sulfonate, an alkylated diphenyloxide sulfonate, or a petroleum sulfonate, and most preferably is Sterling AOS ™, Dowfax 2A1 ™ or Reed Lignin D254-4 ™.

The fluorocarbon surfactant preferably is selected from the groups set forth in U.S. Pat. No. 4,836,281, which is incorporated herein by reference. More preferably, the fluorocarbon surfactant is selected from the group consisting of perfluorobetaines, perfluorosulfobetaines and perfluorocarboxylate betaines. Most preferably, the fluorocarbon surfactant is Fluorad FC-751 TM.

The relative proportions of the ingredients of the surfactant mixture on a weight active basis, is:
fluorocarbon surfactant—0.1% to 20% of the mixture
hydrocarbon surfactant—99.9% to 80% of the mixture
The preferred ratio of hydrocarbon surfactant (wt. %) to fluorocarbon surfactant is 90 to 99.

The gas used to form the foam is conventional. It is an inert gas such as $CO_2$, $N_2$, or methane.

Broadly stated, the invention comprises a surfactant-stabilized foam for use in a subterranean oil-bearing formation, said foam having been generated by admixing a fluorocarbon surfactant solution and a hydrocarbon surfactant solution.

In another broad aspect, the invention is a process for reducing and controlling the mobility of a gaseous displacement fluid in an oil-bearing formation, which process comprises emplacing foam in the formation, said foam having been generated by admixing a fluorocarbon surfactant and a hydrocarbon surfactant solution.

DESCRIPTION OF THE DRAWINGS

FIG. 1 is a schematic diagram of the core-flooding apparatus employed to obtain gas mobility reduction factors (MRF's);

FIG. 2 is a plot of mobility reduction factors versus percent of perfluoro surfactant relative to total surfactant employed in foam core floods; and FIG. 3 is a plot of normalized foam height versus percent of added petroleum oil in the presence of various substitutions of fluorocarbon ("perfluoro") surfactant for hydrocarbon surfactant.

DESCRIPTION OF THE PREFERRED EMBODIMENT

The invention is illustrated and supported by the following examples.

EXAMPLE 1

Foaming tests were conducted in an Osterizer TM blender at 21° C. A 6×60 cm transparent graduated column was fitted with a ⅛ inch stainless steel cooling coil and a calibrated thermocouple and the assembly was fitted onto the blender base. Temperature was controlled by water flow to the cooling coil. Two hundred and fifty ml of 0.5 wt. % surfactant in a 2.1% brine solution was added to the graduated column and the solution was foamed for 5-minutes at the "liquify" setting. The foam height was measured. The experiment was repeated wherein the total surfactant was made up of a mixture of Varion CAS TM sulfobetaine amphoteric surfactant (Sherex Chemical Co. Inc.) and Fluorad FC-751 TM perfluoro-surfactant supplied by the 3-M Corporation. The foam height measurements were conducted both in the absence of petroleum crude oil and in the presence of various amounts of oil. An Alberta crude oil from the Kaybob field (40 degree API gravity) was employed. The results are shown in FIG. 3 where normalized foam height is:

Normalized Foam Height =

$$\frac{\text{Foam height in the presence of crude oil}}{\text{Foam height in the absence of crude oil}}$$

The addition of 2% oil reduced the foam height of Varion CAS by 33%, but the surfactant mixture 95% Varion CAS/5% Fluorad FC-751 showed only a 5% reduction. This result was totally unexpected as the perfluor-surfactant concentration was only 250 parts per million. A very strong synergistic benefit is obtained from the combination of surfactants.

EXAMPLE 2

The foaming experiments of Example 1 were conducted using Dowfax 2A1 TM alkyldiphenyloxide sulfonate surfactant (Dow Chemical) alone and in a mixture of 90% Dowfax 2A1/10% Fluorad FC-751. The petroleum oil was from the Cynthia field (Texaco Canada, API 36 degrees) and 4 ml of oil was added. In the presence of oil the Dowfax 2A1 normalized foam height was 0.20; the mixture foam height was 0.75.

EXAMPLE 3

The foaming experiments of Example 2 were conducted using Varion CADG-HS TM betaine amphoteric surfactant (Sherex Chemical Co. Ltd.) alone and in a mixture 90% Varion CADG-HS/10% Fluorad FC-751. In the presence of oil the Varion CADG-HS normalized foam height was 0.13; the mixture cam height was 0.49.

EXAMPLE 4

The foaming experiments of Example 2 were conducted using Sterling AOS TM α-olefin sulfonate surfactant (Canada Packers Ltd.) alone and in a mixture 90% Sterling AOS/10% Fluorad FC-751. In the presence of oil the Sterling AOS normalized foam height was 0.13; the mixture foam height was 0.49.

EXAMPLE 5

The foaming experiments of Example 2 were conducted using a Sterling AOS/Dowfax 2A1 50/50 (wt.) mixture. In the presence of oil the normalized foam height was 0.11; in a mixture 40% Sterling AOS/40% Dowfax 2A1/10% Fluorad FC-751, the normalized foam height was 0.33.

EXAMPLE 6

The foaming experiments of Example 2 were conducted using Reed Lignin 254-4 TM petroleum sulfonate surfactant alone and in a mixture 90% Reed Lignin 254-4/10% Fluorad FC-751. In the presence of oil, the Reed Lignin 254-4 normalized foam height was 0.60; the mixture foam height was 2.95.

EXAMPLE 7

The foaming experiments of Example 2 were conducted using Varion CAS sulfobetaine amphoteric surfactant (Sherex Chemical Co. Ltd.) alone and in a mixture 90% Varion CAS/10% Fluorad FC-751. In the presence of oil, the Varion CAS normalized foam height was zero; the mixture foam height was 0.60.

EXAMPLE 8

The foaming experiments of Example 2 were conducted using Empigen BT TM carboxylate betaine amphoteric surfactant (Albright & Wilson) alone and in a mixture 90% Empigen BT/10% Fluorad FC-751. In the presence of oil, the Empigen BT normalized foam height was 0.18; the mixture foam height was 0.57.

EXAMPLE 9

Empigen BT and Fluorad FC-751 was tested in low pressure ambient temperature corefloods in oil free cores and in cores containing oil from the Judy Creek field, Beaverhill Lake pool having a density of 0.8296 g/ml and a viscosity of 4.6 mPa.s at 23.0°+/−0.5° C. The porous medium used was a Berea sandstone cut into 2.5×2.5×20 cm blocks that had been wrapped in fiberglass tape and cast in epoxy resin. The coreflooding apparatus is shown in FIG. 1. The cores were flooded with oil and then a 2.1% total dissolved solid brine. Residual oil saturation at this point $S_{or}=28\%$ of pore volume. The cores were then flooded with a mixture of 96% nitrogen+4% brine on a volume basis and the pressure drop across the core was recorded. Volumetric flow rate was 19 ml/hr. Surfactant was added at 0.5 wt. % to the brine and the pressure drop across the core was again recorded. The mobility reduction factor (MRF) was calculated as $$MRF = \frac{\text{Pressure drop in the presence of surfactant}}{\text{Pressure drop in the absence of surfactant}}$$

If no foam is generated within the core, the MRF will be equal to 1 (one). Robust foams are represented by large MRF values. The results using various surfactant mixtures are shown in Table 1.

The betaine hydrocarbon surfactant showed a severe sensitivity to the presence of residual oil; MRF fell from 14 to 2. However, the replacement of only 2% of the hydrocarbon betaine with perfluoro surfactant restored the MRF to 10 in the presence of 28% oil. These results are also shown graphically in FIG. 2.

TABLE I

| Mobility Reduction Factors for Average 96% Foam at 19 mL/h in Berea Sandstone Corefloods at Ambient Temperature and Low Pressure | | | |
|---|---|---|---|
| Surfactant Class | Surfactant Tested | Mobility Reduction Factors | |
| | | Oil-Free Core | Core at $S_{cr}$ |
| Amine Oxide | Atlas CD-413 | 17 | 3 |
| Betaine | Empigen BT | 14 | 2 |
| Mixture of Betaine with Perfluorobetaine | 98% Varion CAS + 2% Fluorad FC-751 | 12 | 10 |
| Perfluorobetaine | Fluorad FC-751 | 34 | 30 |

EXAMPLE 10

A mixture of sulfonated anionic surfactants were evaluated in the same manner as Example 9, except that the core was held within a lead sleeve inside a high pressure steel coreholder. Kaybob crude oil was used (40 degree API) and pressure was maintained at 6.9 MPa within the core. The base hydrocarbon surfactant was a 50/50 mixture of Dowfax 2A1 alkyldiphenyloxide sulfonate and Sterling AOS alfa olefin sulfonate anionic surfactants. This material will be designated Blend A. Core floods were conducted using Blend A and various mixtures of Blend A with Fluorad FC-751 perfluoro surfactant in the absence of residual oil and in the presence of residual oil. The results are given in Table 2 and in FIG. 2. Again a strong and unexpected synergism is demonstrated at low levels of perfluoro surfactant addition. 10% Fluorad FC-751 produces an MRF increase of almost threefold.

TABLE II

| Mobility Reduction Factors at High Pressure (6.9 MPa) in the Presence of Residual Oil | | |
|---|---|---|
| Anionic Blend A | 50% Dowfax 2A1 + 50% Sterling AOS | 12 |
| Blend A + 10% Perfluorobetaine | 45% Dowfax 2A1 + 45% Sterling AOS + 10% Fluorad FC-751 | 33 |
| Blend A + 25% Perfluorobetaine | 37.5% Dowfax 2A1 + 37.5% Sterling AOS + 25% Fluorad FC-751 | 31 |
| Blend A + 50% Perfluorobetaine | 25% Dowfax 2A1 + 25% Sterling AOS + 50% Fluorad FC-751 | 40 |

The embodiments of the invention in which an exclusive property or privilege is claimed are defined as follows:

1. In a process for enhanced oil recovery from a subterranean oil-bearing formation wherein a foam formed from an aqueous solution of a surfactant and a gas is utilized for reducing and controlling the mobility of a subsequently injected gaseous displacement fluid, the improvement comprising emplacing the foam in the formation, either by injecting the pre-formed foam or by alternately injecting the surfactant solution and gas into the formation, wherein the surfactant is a mixture of a fluorocarbon surfactant and a hydrocarbon surfactant, the hydrocarbon surfactant being selected from the group consisting of amphoteric and anionic hydrocarbon surfactants, the relative proportions of the surfactants being, on a weight active basis, 0.1% to 20% fluorocarbon surfactant and 80% to 99.9% hydrocarbon surfactant.

2. The process as set forth in claim 1 wherein the fluorocarbon surfactant is selected from the group consisting of perfluorobetaines, perfluorosulfobetaines and perfluorocarboxylate betaines.

3. The process as set forth in claim 2 wherein the amphoteric hydrocarbon surfactant is selected from the group consisting of betaines, sulfobetaines and carboxylate betaines.

4. The process as set forth in claim 2 wherein the anionic hydrocarbon surfactant is selected from the group consisting of α-olefin sulfonates, alkyldiphenyloxide sulfonates and petroleum sulfonates.

5. The process as set forth in claim 1, wherein the amphoteric hydrocarbon surfactant is selected from the group consisting of betaines, sulfobetaines and carboxylate betaines.

6. The process as set forth in claim 1 wherein the anionic hydrocarbon surfactant is selected from the group consisting of α-olefin sulfonates, alkyldiphenyloxide sulfonates and petroleum sulfonates.

7. The process a set forth in claim 1 wherein the aqueous solution is brine.

8. The process as set forth in claim 1 wherein the relative proportions of the surfactants, on a weight active basis, is 1% to 10% fluorocarbon surfactant and 90% to 99% hydrocarbon surfactant.

* * * * *